March 14, 1961 W. H. CARPENTER ET AL 2,974,497
APPARATUS AND METHOD OF RAPID FREEZING
Filed July 16, 1956 3 Sheets-Sheet 1
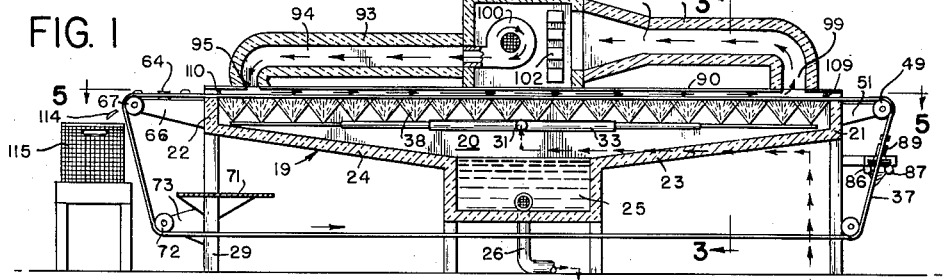
FIG. 1
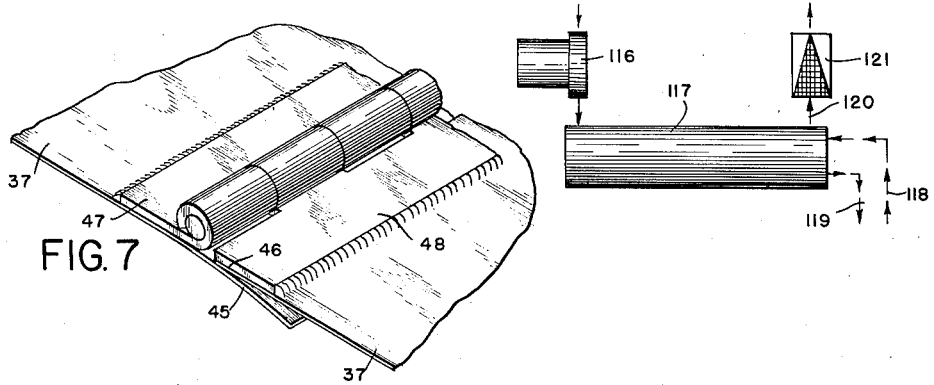
FIG. 7
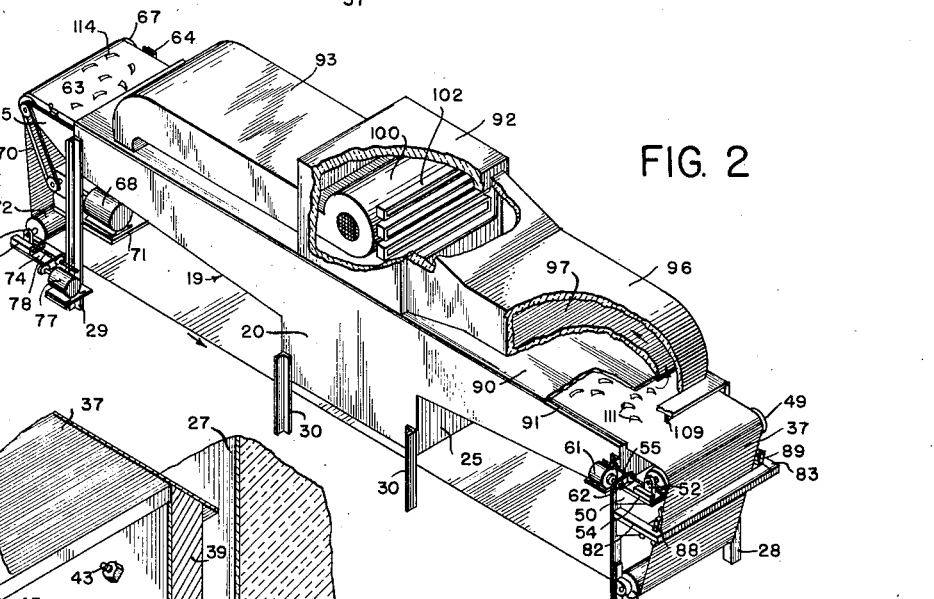
FIG. 2
FIG. 8
INVENTORS
W.H. CARPENTER
B.D. HICE
BY A. Yates Dowell,
ATTORNEYS March 14, 1961    W. H. CARPENTER ET AL    2,974,497
APPARATUS AND METHOD OF RAPID FREEZING
Filed July 16, 1956    3 Sheets-Sheet 2
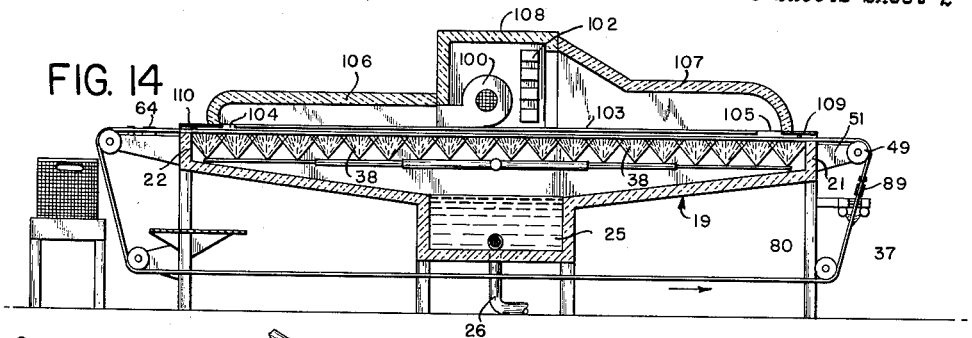
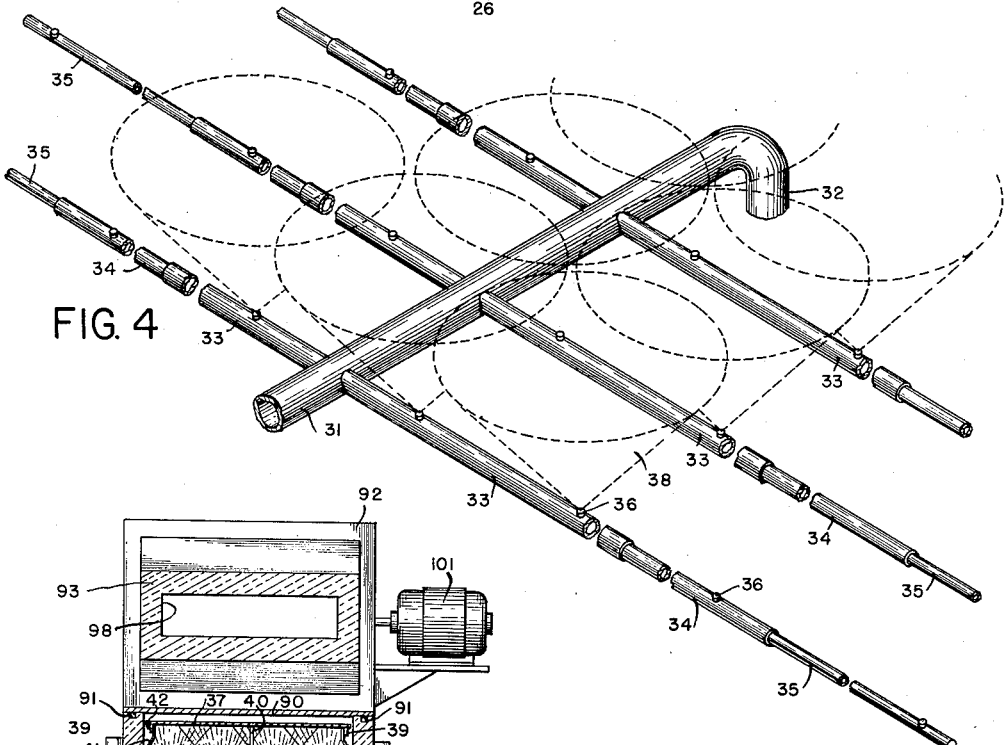
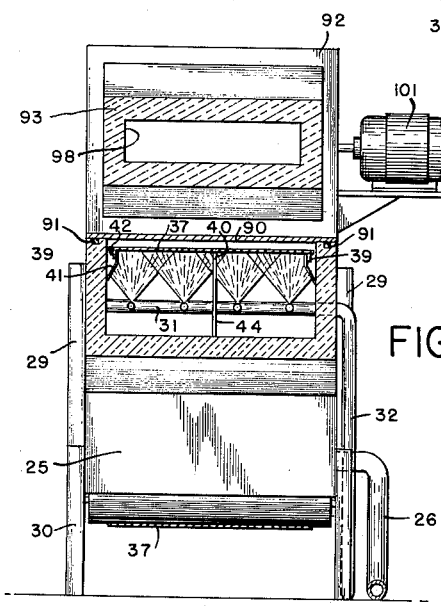
INVENTORS
W. H. CARPENTER
B. D. HICE
BY *A. Yates Dowell,*
ATTORNEYS March 14, 1961 W. H. CARPENTER ET AL 2,974,497
APPARATUS AND METHOD OF RAPID FREEZING
Filed July 16, 1956 3 Sheets-Sheet 3
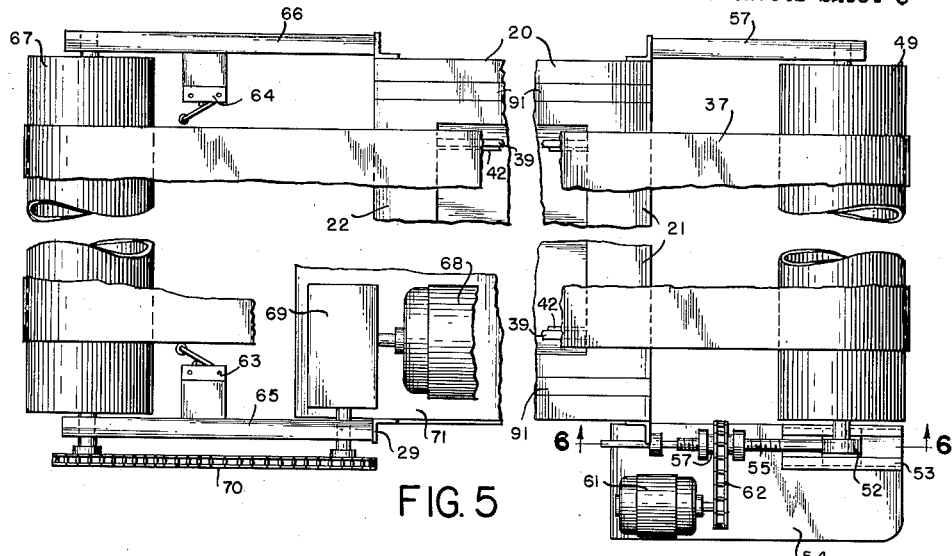
FIG. 5
FIG 9 FIG. 10 FIG. 6
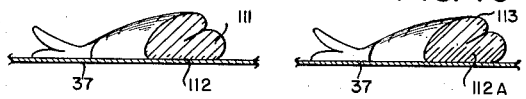
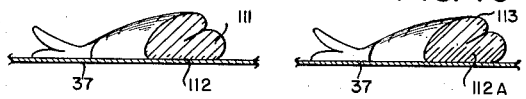
FIG. 11 FIG. 12
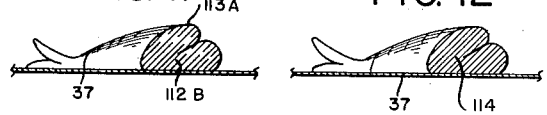
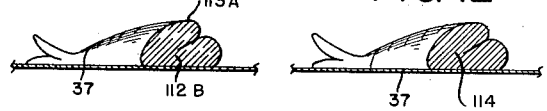
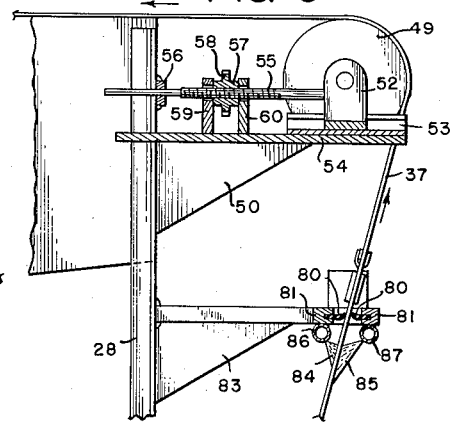
FIG. 13
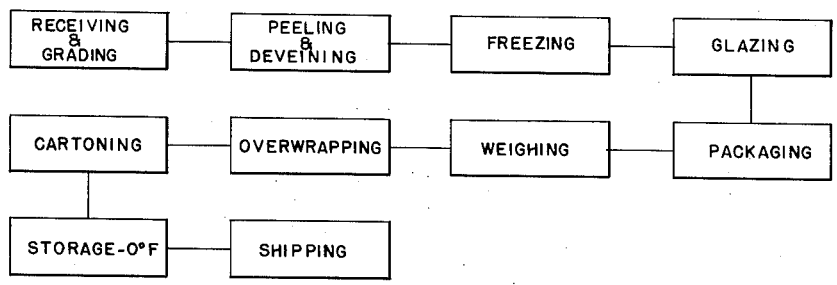
INVENTORS
W. H. CARPENTER
B. D. HICE
BY *A. Yates Dowell*,
ATTORNEYS

United States Patent Office 2,974,497
Patented Mar. 14, 1961

2,974,497
APPARATUS AND METHOD OF RAPID FREEZING

Walter H. Carpenter and Billy D. Hice, Tampa, Fla., assignors to Process Equipment Company, Incorporated, Tampa, Fla., a firm Filed July 16, 1956, Ser. No. 598,156

12 Claims. (Cl. 62—63)

The present invention relates to apparatus and method for the preservation of perishable materials and, more particularly, to the preservation by rapid individual freezing of highly perishable food such as shrimp.

Heretofore, comestibles of various types have been preserved by freezing but the apparatus required for freezing has been extremely expensive, has required large amounts of space and high input of power with relation to the weight of the product and the comestibles have frequently been frozen together rendering it difficult if not impossible to remove only part of the contents of a package for use so the remainder could be saved in frozen condition.

An object of the present invention is to overcome the defects of the prior art and to provide apparatus occupying a minimum of space for rapidly freezing the products without objectionable dehydration and with a minimum of power.

Another object of the invention is to provide a method of rapidly freezing a product by direct contact with a cold wall and a cold air blast cooperating with such cold wall.

A further object is to provide a method of freezing employing a continuous belt cooled by liquid on one side and carrying the product on the other side which product is additionally cooled by a countercurrent of air at substantially the temperature of the belt.

A further object is to provide a method and apparatus for individually freezing articles without contact with one another and to effectively remove such articles after freezing for packaging and maintaining the articles in separated condition.

Other and further objects will be apparent as the description proceeds and upon reference to the drawing wherein:

Fig. 1 is a longitudinal vertical section of one form of the apparatus including an endless metal belt cooled on one side by a liquid and on the other side by a blast of air;

Fig. 2, a perspective view with parts broken away of the apparatus according to Fig. 1 and illustrating the drive mechanism and guiding means for the endless belt of Fig. 1;

Fig. 3, a section taken substantialy on line 3—3 of Fig. 1, illustrating how the cooling brine spray is applied to the underside of the article conveying belt;

Fig. 4, a fragmentary perspective of a portion of the manifold conduit system for supplying liquid to the nozzles by means of which the liquid is sprayed on the underside of the upper run of the conveyor;

Fig. 5, a fragmentary plan view of the open top housing with the belt taken substantially on line 5—5 of Fig. 1 at the top of the open top housing, illustrating the control for maintaining the belt in accurate alignment;

Fig. 6, an enlarged fragmentary section taken substantially on line 6—6 of Fig. 5 showing the means for moving the belt guiding roller to "steer" the belt and the means for cleaning the belt immediately prior to receiving shrimp to be frozen;

Fig. 7, a fragmentary detail of the belt showing a piano hinge connection between the ends of the belt and showing the overlap to prevent the passage of liquid;

Fig 8, a fragmentary transverse section showing a longitudinal guide support for an edge of the conveyor belt and the splash guard for preventing liquid from passing to the outside of the belt;

Figs. 9 to 12, inclusive, fragmentary sections of progressive portions of the conveyor belt with the shrimp thereon showing the progress of the freezing thereof;

Fig. 13, a flow diagram indicating the order in which the shrimp is processed; and Fig. 14, a longitudinal section similar to Fig. 1 of a modification with a partition between the open top housing and cover serving as a bottom wall of an air conduit as well as the top wall of the freezing passage.

Briefly stated, the present invention includes a method and apparatus for quick freezing of deveined and peeled shrimp and the apparatus includes an open top housing having insulated side walls, end walls, and bottom wall with a sump at the bottom thereof and having a network of pipes with nozzles projecting upwardly of such nozzles through which brine or similar heat transfer medium is applied directly against the under surface of a stainless steel endless conveyor belt guided over the top of the housing on longitudinal guiding and supporting strips within the housing and guided by rollers of relatively small radius at exit end of the housing and other rollers as required. The belt is driven by a suitable motor and is guided against excessive lateral movement by automatic belt steering mechanism which is controlled by the position of the edges of the belt on the outgoing end for maintaining the belt in proper operative relation. A hollow cover casing is applied over the open top of the main housing and has a bottom wall or partition closing the top of said main open top housing with the partition being spaced above the upper run of the endless belt thereby providing a passage for articles to be frozen and also a passage for refrigerated air at the same temperature as the brine sprayed on the belt. Such refrigerated air is forced in the opposite direction to the movement of the upper run of the belt whereby articles placed on the belt will be quickly frozen by the action of the sprayed liquid on the under side of the belt and the action of the rapidly moving refrigerated air above the belt. The freezing occurs rapidly in a space of approximately 20 feet and in a brief time interval of approximately 12 minutes, thereby reducing dehydration loss to a minimum.

After freezing the articles are effectively removed or broken loose from the conveyor by the flexing of the conveyor over a roller of approximately 4" radius at the exit end of the housing. The articles drop from the conveyor and may be treated in any way and may be glazed by the residual cold when immersed in water being removed from the water when a sufficient glaze has been obtained after which they may be packaged.

Referring more particularly to the drawing, an open top housing 19 includes a pair of side walls 20, 20, end walls 21 and 22, respectively, and downwardly sloping bottom walls 23, 24 and a sump 25 in which liquid may collect and be removed by means of a drain 26.

The housing 19 is preferably lined on its inner surface with a non-corrodable sheetmetal lining 27 which completely covers the inner surface of the walls thereof and outwardly of such lining the wall is preferably made of "styrofoam" which serves as an insulating material to reduce to a minimum the transfer of heat. The housing 19 is supported from the floor at a suitable height by means of front legs 28, 28, rear legs 29, 29, and intermediate legs 30, for maintaining the open top of the housing 19 at a convenient height.

Mounted within the housing 19 is a skeleton framework of brine supplying pipes comprising a manifold 31 supplied with liquid from a supply pipe 32 carrying a cooling liquid such as brine and from such manifold 32 located substantially midway of the length of the housing a plurality of nozzle supply pipes 33 extend forwardly and rearwardly and are connected to other nozzle supply pipes 34 of somewhat reduced diameter and which pipes 34 are connected to other pipes 35 of still further reduced diameter, each of said pipes 33, 34 and 35 being provided with a suitable number of nozzles 36 at their upper surface for spraying brine in solid cone shaped sprays as clearly shown in Figs. 1, 3, 4 and 14. A commercial nozzle sold by the Spray Right Company has been used effectively.

It will be noted that end walls 21 and 22 of the housing are of less height than the side walls and an endless belt 37 passes through such end walls and over the cone shaped sprays 38, which endless belt is guided along the top of the housing 19 by means of longitudinally extending wooden rails 39, 39 at each edge and a rail 40 at the center of the belt 37 for maintaining said belt 37 in substantially a straight horizontal path. The rails 39 are supported from the adjacent side wall 20 by means of an angle trough including an upwardly and inwardly extending flange 41 and a vertically extending flange 42, the flange 41 being secured to the inner lining 27 by any suitable means, such as welding, and the flange 42 being secured to the adjacent rail 39 by means of bolts 43 or the like. The flange 41 is provided with openings 43A to allow liquid passing outside of the associated rail 39 to drain back into the sump. The center rail 40 is preferably supported by a plurality of uprights 44 extending from the bottom of the open top housing to the rail 40 and carrying a channel or angle member which receives the wooden rail 40 to maintain such wooden rail in accurate position. It will be apparent that other rails may be provided to properly support the belt 37 if necessary. The belt 37 has its ends connected together so that one end 45 underlaps the other end 46 while one leaf 47 of a piano hinge is fixed to the end 45 of the stainless steel conveyor belt 37 by welding or the like, being spaced from the end thereof, and the said one leaf 47 is secured to the end 45 of the belt by welding or the like this arrangement permitting the belt to move in the directions of the arrows as shown in the drawing, the lapping of the end 45 and the end 46 preventing brine being sprayed from the nozzles from passing to the outer surface of the conveyor belt.

The belt 37 passes over and is guided and steered by a roller 49 at the front or entrance end, which roller 49 is supported by means of brackets 50 and 51 projecting from legs 28, 28. The roller 49 is arranged for angular adjustment for guiding or steering the belt 37 and therefore the bearings for such roller 49 provide for limited angular adjustment, the bearing in bracket 51 being relatively fixed while a bearing 52 at the other end of the roller is mounted for sliding adjustment in channel 53 (Figs. 5 and 6) supported on a horizontal shelf 54 on the bracket 50. A threaded rod 55 is secured against rotation to the bearing 52 and extends rearwardly through a guide 56 on the adjacent supporting leg 28 in a way to permit sliding of the bearing 52. Rotatable and threaded by mount on the threaded rod 55 is a nut 57 having a sprocket 58 by which such nut is rotated, said nut 57 being prevented from axial movement by abutments 59 and 60 secured to shelf 54. The nut 57 is rotated by means of a motor and gear reduction unit 61 through a sprocket chain 62, the rotation of the control motor 61 being controlled for forward and reverse motion by means of feelers 63 and 64 mounted respectively on rearwardly extending brackets 65 and 66 projecting from the rear legs 29, 29. Said brackets also carry a belt feeding roller 67 in suitable bearings. The belt feeding roller is driven from a motor 68 through a gear reduction unit 69 and a sprocket and chain drive 70 continuously in a well known manner, the motor 68, and gear reduction unit 69 being suitably supported on a shelf 71 on the rear legs 29, 29. It will thus be seen how the upper run of the belt 37 may be guided by the use of feeler switches 63, 64, which control the guiding roller control motor 61.

The lower run of the belt 37 is guided by means of a guide roller 72 supported at one end for limited pivotal movement in a bearing on the end of a bracket 73 supported from the adjacent supporting leg 29 and supported for forward and backward movement on a plate 74 supported on a suitable bracket from the adjacent supporting leg 29. A bearing 75 similar to bearing 52 is slidably mounted in a guide 76 which bearing 75 is moved forwardly and rearwardly by a motor and gear reduction unit 77 through a chain driving a nut on a threaded rod 78, which threaded rod is similar to rod 55 for causing the roller 72 to be adjusted to various angular positions, by means hereinafter described. The belt 37 after passing roller 72 is passed under guide roller 79 which is rotatably mounted in bearings on legs 28, 28. From the roller 79 the belt 37 passes between rubber-like squeegee devices 80, 80 (Fig. 6) suitably supported by transverse members 81, 81, in turn supported on brackets 82, 83 extending forwardly and supported on legs 28, 28. The belt 37 is kept clean by means of water spray 84, 85 passing through orifices from manifold pipes 86, 87 mounted on transverse members 81, 81, respectively, and connected to a suitable source of fresh water for spraying such water against the belt and washing off the silt and any other foreign matter to prevent objectionable material from coming in contact with the shrimp or other articles being frozen. Mounted on the brackets 82 and 83 are switches 88 and 89, respectively, which are similar to switches 63, 64 but controlling motor 77 for varying the angularity of the guiding and steering roller 72 for correcting the position of the belt in accordance with its position in which it is being fed onto the guide roller 49. As a result of this arrangement, it is possible to control the position of the belt 37 within definite limits even though the belt is continuously moving sidewardly, the guiding of the belt is correspondingly continuously controlled by the switches 63, 64, 88 and 89, which control steering rolls 49 and 67 respectively thereby maintaining sufficiently accurate guidance to prevent cutting of the side walls of the housing and preventing damage to the edges of the belt.

Resting upon the upper edges of the sidewalls 20 of the housing 19 is a cover including a partition 90 formed of plywood or the like which rests on gaskets 91 positioned in grooves in the sidewalls 20 with such gaskets being of resilient material to effectively seal joints between the partition 90 and the sidewalls 20 of the housing. Mounted on the partition 90 is a casing including a fan and refrigerating unit cabinet 92 and a duct 93 extending from such cabinet to adjacent the rear end of the main housing 19 with such duct having a passageway 94 in communication with the space between the plywood partition 90 and the belt 37 with the outlet 95 of such passage being reversely curved to cause air to follow the path shown by the arrows. A cooperating duct 96 provided with a passage 97 communicates with the front end of the space between said partition 90 and the belt 37 by means of a throat 99. Within the fan and refrigerating unit cabinet 92 a fan casing 100 is provided with a radially bladed drum-type fan driven by a motor 101 as is well-known in the art and evaporator coils 102 are provided in the path of air from passage 98 to passage 94 for cooling passing air. The coils 102 may be maintained at a desired temperature by the use of brine or other cooling media as desired.

It will be noted that the entire cover casing including the plywood partition 90, the fan and refrigerating unit cabinet 92 with the ducts 93 and 96 is removable as a unit to permit assembly and to provide for servicing the equipment.

In Fig. 14 the open top main housing 19 is substantially the same as that shown in the other figures, but the removable cover includes a partition 103 resting upon gaskets in the sidewalls 20, 20, such partition having an opening 104 adjacent, the rear end for the passage of air through the partition into the space between said partition and the belt 37, said partition also having an opening 105 for the passage of air from the space between partition 103 and belt 37, the ducts from said openings 104 and 105 being designated by reference numerals 106 and 107, the partition 103 serving as one of the walls of said ducts while a fan and refrigerating unit cabinet 108 contains the usual fan 100 and the cooling coil 102. By this arrangement, it will be noted that the structure is simplified and the exposed surface of the cover is substantially reduced, thereby reducing heat transmission through the walls.

To prevent the entrance of outside air into the space between the belt 37 and the partition 90 or 103, a comb-like element 109 of flexible material may be provided for engaging the articles and is preferably located in such a position that when the damp articles are placed on the belt the instantaneous freezing secures the articles to the belt thereby causing articles to move under said comb-like element 109. A similar comb-like element 110 may be provided on the exit end thereby providing a closed space through which the air is circulated by said fan 100. If desired, an inflated roller may be used for closing the space, such inflated roller being compressible to accommodate the irregularly shaped articles such as shrimp without interfering with the passage thereof.

Operation

From the above description, it is believed that the operation of the machine and the steps of the method should be apparent but for clarity it will be noted that the stainless steel metal belt 37 is continuously operated in the direction shown by the arrows passing over steering roller 49 and along the top of the open top housing 20 being supported in its passage by means of the longitudinal rails 39, 39 and 40 and passing outwardly over the driven roller 67 and thence downwardly under a second steering roller 72 and under the housing 19 to an idler roller 79, thence upwardly through the fresh water sprays 84, 85 and through squeegee device 80, 80, which scrape the water off the belt and thence back to the steering entrance roller 49. Shrimp 111 are placed on the portion of the conveyor belt above the brackets 50, 51 by workers and when the belt carrying such shrimp 111 passes inside of the housing, the cold brine sprays 38 immediately freeze the moist shrimp tightly to the belt so that the comb-like gate device 109 cannot dislodge the shrimp and the shrimp continues through the space formed between the belt 37 and the partition 90 passing from the state in which just the bottom 112 is frozen as shown in Fig. 9 to the state in which the freezing has progressed upwardly from the bottom to 112A as shown in Fig. 10. At this time the blast of cold air moved by the fan 100 and cooled by the coils 102 passes rapidly through the freezing chamber and freezes the upper portion 113 as shown in Fig. 10, and as the shrimp passes along this space the freezing continues to the state shown in Fig. 11 where the freezing at the bottom has extended up through an area designated 112B and has extended downwardly from the top to include the area 113A until finally the shrimp is completely frozen to the state designated 114 where the freezing is entirely completed.

This sequence of freezing steps is clearly shown in Figs. 9–12 inclusive where a section of the shrimp is shown, such shrimp having been completely peeled and deveined by a process such as that of the Eric Johnson machine so that the shrimp is in a state ready to be cooked and eaten without requiring any additional preparation. After the shrimp passes out of the freezing space, the belt passes over the 8 inch diameter driving roller 67, and the hard frozen shrimp maintains its rigidity so that the hard frozen shrimp 114 is broken loose from the belt and is deposited in a container or the like 115.

After the freezing operation, the hard frozen shrimp 114 may be passed into water and glazed with a coating by the residual cold in the frozen shrimp to protect the shrimp against dehydration. Thereafter the shrimp is packaged, weighed, overwrapped, cartoned and stored at zero degrees and shipped from the storage in the usual way. It may be observed that the shrimp are individually frozen without one shrimp adhering to another and therefore the packaging is greatly simplified and it is possible for the consumer to buy a large package and only use part of the contents without requiring thawing of the remainder of the contents.

Prior to the present invention the shrimp have been frozen in a tunnel by the use of metal trays positioned by workmen on trucks and trucks moved through a tunnel. An air blast is forced through the tunnel past the trucks of filled trays and this required large consumption of power to produce the necessary freezing and also required approximately 45 minutes at from −50° to −70° to completely freeze the shrimp and frequently, as the trucks were jarred or the trays were handled, the shrimp would come against one another thereby freezing a number of them together, and this would require thawing and refreezing. In any case, the losses due to heating excessive amounts of metal including the trucks and trays, required so much power that less than 20% of the power input was usefully used in freezing the shrimp.

In contradistinction to the prior art method of freezing, applicants provides an approximately 20 foot long freezing passage about 2 inches high and 4 feet wide through which the belt of approximately 47½ inches in width and weighing approximately 10 pounds per foot passes and such belt is cooled to a minus 40 degrees F. instantaneously by the sprays 38 so that the shrimp immediately adhere to the belt thereby preventing any possibility of individual shrimp freezing to one another and the air blast fed at approximately a minus 40 degrees F. and approximately 2000 cu. ft. per minute at ¾" static pressure rapidly freezes the upper portions of the shrimp, the under portions of the shrimp being frozen by the contact with the metal belt which produces a major portion of the freezing. Also, the shrimp is frozen in a period of from 12–15 minutes with the present invention, and consequently, the dehydration is reduced to a minimum in the order of 1 to 1½% while with the previous method the dehydration loss was 3% or more. It will be apparent that there is no appreciable transfer of cold or heat from the air to the belt or from the belt to the air since the air is maintained at substantially the same temperature as the belt and the motion of the air prevents stratification so that the freezing is accomplished at a high rate. When a shrimp is peeled and deveined, it loses approximately 22% of its weight and when it is frozen solely by the passage of air, it loses another 3% due to dehydration. With applicants' method, it is possible to reduce the dehydration loss to as little as 1% and since the shrimp are individually frozen, they may be glazed with a glaze sufficient to add approximately 22% so that the finished product is of substantially the same weight as the shrimp before the peeling and deveining. Further, the appearance of the shrimp and the taste is preserved because of the reduction of the dehydration losses during the freezing as well as during any periods of storage. Further, the packaging of the individual shrimp after the freezing avoids any bulging of the packages thereby simplifying storage and handling problems. Applicants have selected the arrangement described and shown because the specific heat of unfrozen shrimp is approximately .76 while the specific heat after the freezing is approximately .45 and consequently it would require an excessive amount of space to freeze the shrimp solely by contact with the cold belt because of the reduction of the rate of heat transfer through the frozen portion of the shrimp, and therefore, the air blast on the top of the shrimp is selected to obtain the maximum freezing in a minimum time.

Further, the rapid freezing prevents the rupturing of the tissues and the rupturing of the cells thereby additionally retaining the valuable mineral food elements in the shrimp or other product being processed. Further, with applicants' apparatus and method the freezing temperature of a minus 40 degrees may be obtained with a single stage refrigerating unit thereby reducing initial cost of the machine as well as the operating and upkeep costs.

The shrimp may be breaded or coated with other coating immediately after freezing more effectively than when the shrimp is unfrozen, and this further simplifies the processing of the shrimp for final use. It will be noted that the steering rollers 49 and 72 make it possible for the belt to be accurately controlled within relatively fine limits thereby preventing damage to the edges of the belt as well as to the lining of the housing and since this guiding action is a continuous operation there is no danger of damage.

The brine used for forming the spray 38 is collected in the sump 25 from which it is drained through drain 26 to a motor-driven pump 116 which forces the brine after contacting and cooling the belt into the heat exchanger 117 in which cooling coils are supplied with a refrigerant by means of inlet refrigerant pipes 118 and outlet refrigerant pipes 119 and from the heat exchanger 117 the brine passes by means of a conduit 120 to a strainer device 121 which removes small particles and thereafter the brine is passed along conduit 32 to the manifold 31 and to pipes 33, 34 and 35 and through nozzles 36 whereby the brine is sprayed directly on the underside of the stainless steel belt 37. The stainless steel belt is continuously washed with the sprays formed by spray pipes 86, 87 which continuously spray the inner and outer surfaces thereby preventing any possibility of the salt in the brine solution coming in contact with the product being frozen.

It will be obvious to those skilled in the art that various changes may be made in the invention without departing from the spirit and scope thereof, and therefore the invention is not limited by that which is illustrated in the drawing and described in the specification, but only as indicated in the accompanying claims.

What is claimed is:

1. Apparatus for quick freezing a product within a minimum of space comprising an open top housing having sidewalls, end walls, bottom walls, and a sump in the bottom with the end walls being of less height than the side walls, a framework of liquid carrying tubes mounted in said casing and having a plurality of nozzles opening upwardly, an endless belt mounted to overlie said open top housing to close such open top with one run and having its other run extending therebelow, guide rollers at each end of said housing over which said endless belt passes, means to drive said belt in one direction, a hollow cover casing resting upon the upper edges of the housing side walls and having a partition arranged in spaced relation to said upper run of said belt to provide a passage for articles to be frozen, means to cool and, direct air through the space between said partition and said belt in an opposite direction to the motion of said belt, means to cool and force liquid from said nozzles against the under surface of said upper run of said belt to maintain said upper run in freezing condition and means whereby said belt may be maintained in accurate air serving to additionally freeze the upper portion of length to effectively freeze the articles and said blast of air serving to additionally freeze the upper portion of said articles, and polyethylene comb means at each end of said passage to prevent outside air from entering said passage and preventing loss of cooling air.

2. Apparatus for quick freezing a product within a minimum of space comprising a support, a skeleton tubular liquid carrying framework mounted on said support and having a plurality of jets, a belt mounted for movement so the jets impinge on one surface of said belt, a cover arranged in spaced relation to said belt to provide a passage for articles to be frozen between the other surface of said belt and said cover, means to cool and direct air through the space between said cover and said belt, means to cool and force liquid from said jets against the said one surface of said belt to maintain said belt in freezing condition, and means whereby said belt may be maintained in accurate alignment at all times, said belt being of a minimum length to effectively freeze the articles and said directed air serving to additionally freeze the portion of said articles spaced from said belt.

3. Apparatus for quick freezing a product within a minimum of space comprising a support, a skeleton tubular liquid carrying framework mounted on said support and having a plurality of jets, a belt mounted for movement so the jets impinge on one surface of said belt, a cover arranged in spaced relation to said belt to provide a passage for articles to be frozen between the other surface of said belt and said cover, means to cool and direct air through the space between said cover and said belt, means to cool the liquid below freezing and force liquid from said jets against the said one surface of said belt to maintain said belt in freezing condition, and means whereby said belt may be maintained in accurate alignment at all times, said belt being of a minimum length to effectively freeze the articles and said directed air serving to additionally freeze the upper portion of said articles, and means to sharply flex the belt to remove the product from the belt.

4. Apparatus for processing material in a continuous manner comprising an open top housing, a conveyor belt extending across the open top of said housing, means to maintain said belt in operative position along the open top of said housing and for guiding such conveyor belt with sufficient accuracy to prevent damage to the belt and to the housing, a cover positioned over said housing and resting on the sidewalls thereof, resilient gasket means between the sidewalls of said housing and said cover to effectively seal the space above said conveyor, means for applying temperature modifying characteristics to said belt and means for applying temperature modifying characteristics to the space between said cover and said belt whereby articles supported on said belt may be rapidly and effectively processed without damage to the article in a minimum of time and space.

5. The invention according to claim 4 in which the belt is made of stainless steel and has its ends overlapping, piano hinge means between the ends of the belt with a removable pin to permit assembly, the overlap being arranged so as not to interfere with the passage of said belt.

6. A method of freezing comestibles for the purpose of preserving such comestibles comprising placing the comestibles on a horizontal traveling flexible solid metal belt, cooling the under surface of said metal belt with a liquid at a temperature of 40° F. below zero, simultaneously applying a high velocity current of air at substantially the same temperature as said liquid and directing such stream of air in counter flow to the direction of movement of the comestibles and after completely freezing such comestibles entirely through the bodies thereof, moving such comestibles and the metal belt on which they are supported over a curved guide to bend the metal belt at a sufficiently sharp angle to break the frozen comestibles loose therefrom.

7. The method according to claim 6, in which the frozen comestible is passed through a bath of water and a protective glazing coating is applied over the entire surface of the comestible in an amount approximately sufficient to equal the loss in preparation of such comestible and whereby the comestible may be retained in fresh condition without loss of moisture for an extended period of time.

8. A method of freezing comestibles for the purpose of preserving such comestibles comprising placing the comestibles on one surface of a traveling flexible solid metal belt, cooling the other surface of said metal belt with a liquid at a temperature of 40° F. below zero, simultaneously applying a high velocity current of air at substantially the same temperature as said liquid and directing such stream of air in a direction opposite to the movement of the comestibles.

9. The method of freezing moist products comprising applying the moist product in spaced relation on a highly conductive belt, conveying the product on the highly conductive belt, applying refrigerant at a temperature substantially below freezing on the under side of the belt to instantly freeze the contacting portion of the products to the belt so that the products will adhere to the belt, passing the belt with the adhering products through a confined space of restricted vertical and lateral dimensions, forcing a blast of gas through such space in a direction generally parallel to the surface of the belt, and refrigerating such gas to below freezing temperatures whereby such products are rapidly frozen on their surfaces and through the entire body of the products in a minimum of time and with a minimum of dehydration.

10. A method of freezing comestibles for the purpose of preserving such comestibles comprising placing the comestibles on one surface of a traveling flexible solid cold conductive belt, cooling the other surface of said cold conductive belt with a liquid at a temperature of approximately 40° below zero, simultaneously applying a current of air at substantially the same temperature as said liquid and directing such stream of air in a direction opposite to the movement of the comestibles, thereafter substantially completely freezing such comestibles, and thereafter flexing the belt on which they are supported over a curved guide to bend the belt at a sufficiently sharp angle to break the comestibles loose from said belt.

11. The invention according to claim 9 in which the products are separated from the conveyor belt by a sharp flexing thereof.

12. The method of freezing wet edible products comprising applying the wet edible products in spaced relation on a highly conductive belt, conveying the products on the highly conductive belt, applying a liquid refrigerant at a temperature substantially below freezing on the under side of the belt to instantly freeze the contacting portion of the edible products to the belt so the edible products will adhere to the belt, passing the belt with the adhering products through a confined space of restricted vertical and lateral dimensions, forcing a blast of air through such space in a direction generally parallel to the surface of the belt, refrigerating such air to below freezing temperatures and recirculating the same air at the low freezing temperature whereby each product is rapidly frozen on its surface and through its entire body in a minimum of time and with a minimum of dehydration.

References Cited in the file of this patent
UNITED STATES PATENTS

| | | |
|---|---|---|
| 1,773,081 | Birdseye | Aug. 12, 1930 |
| 1,992,649 | Brunk | Feb. 26, 1935 |
| 2,019,551 | Varney | Nov. 5, 1935 |
| 2,076,413 | Ostertag | Apr. 6, 1937 |
| 2,194,684 | Bedford | Mar. 26, 1940 |
| 2,212,916 | Hawkins et al. | Aug. 27, 1940 |
| 2,274,292 | Hiller | Feb. 24, 1942 |
| 2,276,471 | Eberhart | Mar. 17, 1942 |
| 2,610,476 | Field | Sept. 16, 1952 |
| 2,643,526 | Turner | June 30, 1953 |
| 2,724,492 | Kolbe | Nov. 22, 1955 |
| 2,783,871 | Sowards | Mar. 5, 1957 |